US012576983B2

(12) United States Patent　　　(10) Patent No.: US 12,576,983 B2

Hauzeray et al.　　　(45) Date of Patent: *\*Mar. 17, 2026*

(54) AIRCRAFT COMPRISING, IN ITS FUEL TANK, A CHAMBER PROVIDED WITH A SENSOR

(71) Applicant: SAFRAN AEROSYSTEMS, Plaisir (FR)

(72) Inventors: Sylvain Hauzeray, Plaisir (FR); Gilles Delaitre, Plaisir (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 247 days.

This patent is subject to a terminal disclaimer.

(21) Appl. No.: 17/925,971

(22) PCT Filed: May 17, 2021

(86) PCT No.: PCT/FR2021/050850

§ 371 (c)(1),
(2) Date: Nov. 17, 2022

(87) PCT Pub. No.: WO2021/234258

PCT Pub. Date: Nov. 25, 2021

(65) Prior Publication Data

US 2023/0202669 A1　　Jun. 29, 2023

(30) Foreign Application Priority Data

May 18, 2020　(FR) ...................................... 2004966

(51) Int. Cl.
B64D 37/02　　　(2006.01)
B64D 37/00　　　(2006.01)
(Continued)

(52) U.S. Cl.
CPC ........... B64D 37/02 (2013.01); B64D 37/005 (2013.01); B64F 5/60 (2017.01); F02C 7/222 (2013.01);
(Continued)

(58) Field of Classification Search
CPC ........... F02M 37/0052; F02M 37/0082; F02M 37/0088; F02M 37/0094; F02M 37/103;
(Continued)

(56) References Cited

U.S. PATENT DOCUMENTS 3,739,635 A　　6/1973　Stuart
4,672,937 A　*　6/1987　Fales ...................... F02M 37/18
123/495
(Continued)

FOREIGN PATENT DOCUMENTS

EP　　　3023751 A2　　5/2016
EP　　　3023751 A3　　5/2016
(Continued)

OTHER PUBLICATIONS

Ochs, Robert Ian, "Vaporization of JP-8 Jet Fuel in a Simulated Aircraft Fuel Tank Under Varying Ambient Conditions", Technical Thesis DOT/FAA/AR-TT09/42, Aug. 2009, 86 pages (Year: 2009).*
(Continued)

*Primary Examiner* — David A Testardi
(74) *Attorney, Agent, or Firm* — Sughrue Mion, PLLC

(57)　　　　　ABSTRACT

An aircraft includes an engine, a fuel tank, a chamber, a system, and an introduction line. The chamber is located in the tank, occupies only a part of the tank, and includes a sensor for measuring a property of the fuel. The system injects fuel into the line. The introduction line introduces fuel from the injection system into the chamber. The intro- (Continued)

duction line includes a valve capable of preventing an introduction of fuel from the injection system into the chamber via the line.

5 Claims, 4 Drawing Sheets

(51) Int. Cl.
| | |
|---|---|
| *B64F 5/60* | (2017.01) |
| *F02C 7/22* | (2006.01) |
| *F02M 37/10* | (2006.01) |

(52) U.S. Cl.
CPC ....... *F02M 37/106* (2013.01); *F05D 2260/60* (2013.01); *F05D 2260/80* (2013.01)

(58) Field of Classification Search
CPC F02M 37/106; G01F 1/86; B64C 3/34; F02C 7/22–2365; B64D 37/02
See application file for complete search history.

(56) References Cited

U.S. PATENT DOCUMENTS

| | | | | |
|---|---|---|---|---|
| 4,881,700 | A * | 11/1989 | Sarh | B60F 5/02 244/218 |
| 4,926,829 | A * | 5/1990 | Tuckey | F02D 41/3082 123/41.31 |
| 5,085,198 | A * | 2/1992 | Bartlett | F02M 53/02 123/514 |
| 5,429,096 | A * | 7/1995 | Fukasawa | F02M 37/0094 123/514 |
| 5,692,479 | A * | 12/1997 | Ford | F02M 37/025 123/514 |
| 6,062,203 | A * | 5/2000 | Takahashi | F02M 37/44 123/509 |
| 6,302,144 | B1 * | 10/2001 | Graham | F02D 41/266 137/565.17 |
| 6,584,777 | B1 * | 7/2003 | Clarke | F02C 9/28 60/776 |
| 8,515,694 | B1 | 8/2013 | Orloff et al. | |
| 12,320,689 | B2 * | 6/2025 | Hauzeray | G01F 1/86 |
| 2003/0221675 | A1 * | 12/2003 | Washeleski | F02D 41/0032 123/497 |
| 2004/0065144 | A1 * | 4/2004 | Mitani | F02M 37/106 73/114.45 |
| 2012/0000205 | A1 * | 1/2012 | Coffinberry | B64D 13/06 60/806 |
| 2013/0048119 | A1 * | 2/2013 | Kim | F02M 37/106 137/565.01 |
| 2013/0211703 | A1 * | 8/2013 | Evrard | G01F 9/008 701/123 |
| 2013/0233283 | A1 * | 9/2013 | Rinke | F02M 37/0035 123/495 |
| 2013/0255642 | A1 * | 10/2013 | Ikeya | F02D 19/0634 123/494 |
| 2014/0224216 | A1 * | 8/2014 | Coachman | F02D 33/003 123/446 |
| 2015/0114363 | A1 * | 4/2015 | Voss | F02M 31/20 123/541 |
| 2015/0152790 | A1 * | 6/2015 | Javelot | F02C 9/32 60/776 |
| 2015/0159771 | A1 * | 6/2015 | Goguet-Chapuis | F02C 7/236 137/492.5 |
| 2015/0167597 | A1 * | 6/2015 | Nagasaku | F02M 59/44 123/520 |
| 2016/0023527 | A1 * | 1/2016 | Dietrich | B64D 35/024 244/2 |
| 2016/0123860 | A1 * | 5/2016 | McBrien | G01N 33/225 702/25 |
| 2016/0177838 | A1 * | 6/2016 | Gomes | F02C 7/22 137/565.29 |
| 2016/0238484 | A1 * | 8/2016 | Veyrat-Masson | F16K 37/005 |
| 2016/0312706 | A1 * | 10/2016 | Veyrat-Masson | F02C 7/232 |
| 2017/0129619 | A1 * | 5/2017 | Morgan | B64D 37/22 |
| 2018/0017028 | A1 * | 1/2018 | Kalyuta | F02M 37/10 |
| 2019/0003870 | A1 * | 1/2019 | Quartarone | G01F 22/00 |
| 2019/0176999 | A1 * | 6/2019 | Lamourette | G01F 1/86 |
| 2019/0283894 | A1 * | 9/2019 | Hall | G06F 1/00 |
| 2020/0080524 | A1 * | 3/2020 | Soreo | F02M 37/106 |
| 2020/0080525 | A1 * | 3/2020 | Soreo | F04B 49/04 |
| 2021/0229827 | A1 * | 7/2021 | Doman | F02C 7/14 |
| 2023/0194322 | A1 * | 6/2023 | Hauzeray | B64D 37/28 60/39.281 |

FOREIGN PATENT DOCUMENTS

| | | | | | |
|---|---|---|---|---|---|
| FR | | 2764945 | A1 * | 12/1998 | F02M 37/106 |
| FR | | 2890694 | A1 * | 3/2007 | F02D 19/0628 |
| GB | | 2172864 | A * | 10/1986 | B60K 15/077 |
| JP | | 3704345 | B1 | 10/2005 | |
| WO | WO-2014057093 | A1 * | 4/2014 | B60K 15/03 |
| WO | WO-2018002682 | A1 * | 1/2018 | B64D 37/005 |
| WO | WO-2019012238 | A1 * | 1/2019 | F02C 7/22 |

OTHER PUBLICATIONS

Shell Trading Rotterdam B.V, "AVGAS 100LL Safety Data Sheet", AVGAS 100LL (<0.1% benzene), Version 2.1, Effective Date Jan. 28, 2014, 57 pages (Year: 2014).*
InnovationQ+ machine translation of FR 2764945 A1 (original FR document published Dec. 24, 1998) (Year: 1998).*
French Preliminary Search Report dated Jan. 14, 2021 in Application No. FR 2004966.
International Search Report dated Jul. 16, 2021 in Application No. PCT/FR2021/050850.
Office Action issued Jul. 16, 2024 in Chinese Application No. 202180044402.X.

* cited by examiner

AIRCRAFT COMPRISING, IN ITS FUEL TANK, A CHAMBER PROVIDED WITH A SENSOR

CROSS REFERENCE TO RELATED APPLICATIONS

This application is a National Stage of International Application No. PCT/FR2021/050850 filed on May 17, 2021, claiming priority based on French Patent Application No. 2004966 filed on May 18, 2020, the contents of each of which being herein incorporated by reference in their entireties.

FIELD OF THE INVENTION

The invention relates to the identification of properties of the fuel on-board aircraft, in particular airplanes.

PRIOR ART

It is known that, in order to guarantee the range of an airplane in flight, its gauging system estimates the mass of fuel on board at any time, on the ground and in flight. The precision of the estimate depends on the number and precision of the sensors used, as well as on the physical quantities measured. The gauging system aims to obtain the required precision in the measurement of the mass of fuel on board, and to do so under the storage conditions in the tanks. However, for the pilot, the mass of fuel available is not a sufficient indicator. He needs to know the remaining range of his airplane. To make this change of indicator, the performance of the engine must be considered, but this is dependent on the properties of the fuel used. In addition, in order to adjust the injection cycle of the fuel into the engines, the engine control computer could use the gauging system measurements, but in fact this is not sufficient because the storage conditions in the tanks and the injection conditions are very different.

These difficulties are due, in particular, to the fact that the properties of the fuel during use are not fully known. To overcome this, the injection of the fuel into the engine is carried out so as to guarantee the performance and safety objectives, but without considering optimisation of consumption. In other words, the injection takes place with a margin which leads to an overconsumption.

This problem will be accentuated due to the increasing use of biofuels, increasing the variability in the properties of the fuels used by aircraft. Indeed, this overconsumption already exists when using standard kerosene, but it will increase with the use of biofuels with variable incorporation rates which can range up to 100%. This will generate a larger variability in the properties of fuels, which must be taken into account by increasing the overconsumption margins in order to continue to guarantee the safety of flights.

It is therefore desirable that the gauging system delivers all of the properties of the fuel to the engine control computer, enabling it to guarantee the performance and safety of the flight, while reducing this margin as much as possible.

For this reason, it is sought to estimate the properties of the fuel more precisely.

To this end, it is known that the gauging system incorporates a sensor for measuring fuel properties, in the tank or tanks. This characterisation is carried out by considering the temperature of the fuel.

More specifically, it is considered that the relation between the density of the fuel and its temperature is a linear function. This function, when plotted for different types of fuel, gives lines that are substantially parallel to one another. The same applies to the relation between the dielectric constant (K, also called the relative permittivity $e_r$) and the temperature. The relation between the dielectric constant K and the density D is also known.

This relation is expressed by a formula derived from the so-called Clausius-Mossotti generic formula:

$$D=(K-1)/[A+B(K-1)]$$

These relations are known, for example, from document U.S. Pat. No. 8,515,694 which also shows graphs of these functions.

All this information is sufficient for determining the mass of fuel on board, but not for predicting the properties of the fuel at the temperature of injection into the engines.

For that, these properties are estimated, more or less precisely, depending on the presence and, where appropriate, the type of sensor located in the fuel supply line of the engine. The various possible configurations are the following:

1) No sensor: the injection is carried out taking into account all the possible disparities of the fuel.
2) Temperature measurement: the injection is optimised with respect to the injection temperature, while still taking into account the disparity of the fuels.
3) In addition to the temperature measurement, the dielectric permittivity measurement makes it possible to reduce the disparity to be taken into account.
4) The optimum configuration would be to measure the density, but implementing this is very difficult due to density measurement technologies and local measurement conditions (temperature, vibrations).

The quantity of fuel injected is usually measured by a volume flow meter, and sometimes by a mass flow meter, although the latter has a very variable precision depending on the flow rate. Knowing the estimate of the properties of the fuel and taking into account the necessary safety margins, the injection into the engine is regulated by the use of the volume or mass flow meter. The measurement of volume flow rate is rather precise, but does not take into account the properties of the fuel, unlike the mass flow rate measurement which takes into account the density of the fuel, but which has a lower measurement precision.

Document WO 2018/2682 describes an airplane fuel tank in which a chamber is equipped with a sensor that can measure at least one property of the fuel entering into the tank during filling thereof. The fuel supply circuit of the airplane from outside communicates into the tank with a supply line which has a bypass in the form of a measurement line opening directly into the chamber. The measurement of the property by means of the sensor in the chamber therefore relates to the fuel arriving in the tank during filling.

However, this arrangement offers limited possibilities for knowing the properties of the fuel as injected into the engine.

An object of the invention is therefore to have better knowledge of the properties of the fuel injected into the engine in order to meter it with greater precision.

DISCLOSURE OF THE INVENTION

To this effect, an aircraft is disclosed comprising:
at least one engine,
at least one fuel tank, a chamber which is located in the tank, occupying only a part of the tank and comprising at least one sensor for measuring a property of the fuel, a system for injecting the fuel into the engine, a line for introducing fuel from the injection system into the chamber, the line comprising a valve capable of preventing the introduction of fuel from the injection system into the chamber via the line.

Hence, this arrangement can send the fuel coming from the injection system, directly into the measurement chamber. The chamber can therefore then be used to know one or more properties of the fuel coming from the injection system, in particular after having been heated in the latter. Indeed, the temperature of the fuel coming from the injection system is generally higher than that of the fuel in the reservoir. This therefore makes it possible to characterise the fuel at a temperature which is closer to its effective temperature of injection into the engine. This also makes it possible to measure the properties of the fuel in the chamber at various temperatures, in particular before and after fuel coming from the injection system is reintroduced into the chamber. For example, if the sensor is a density or dielectric constant sensor, knowledge of the values of each quantity taken at various temperatures makes it possible to establish, with precision, the function for determining this quantity as a function of temperature.

This injection of fuel coming from the engine into the chamber makes it possible to obtain several effects, according to the configuration of the chamber:

exchanger mode: there is no mixing of fuel but only an exchange of heat in order to change the temperature;

mixing mode: the two liquids mix so that the temperature changes as a function of their respective contents in the mixture;

replacement mode: the incoming liquid pushes back the liquid that is present, taking its place; and mixed mode: this is a mixture of two or three of the preceding modes.

The third mode is that which offers the shortest transition time.

It will be possible, in particular, to use a chamber like that of document WO 2018/002682.

In order to implement the exchanger mode in strictly, a pure heat exchanger is required. However, in general, without thermal insulation, there are necessarily heat exchanges.

The mixing mode is the most intuitive.

The replacement mode is close to that of document WO 2018/002682, but this mode is difficult to implement strictly. In reality, there is a little mixing and heat exchange, but this is very effective, much more than the mixing mode. The liquid entering the chamber replaces the preceding liquid, whatever their respective temperatures and densities. It is the structure of the chamber detailed in WO 2018/002682 which allows this effect.

The sensor or one of the sensors can be a density sensor, a dielectric constant sensor and/or a temperature sensor.

Advantageously, the introduction line opens into a measurement line communicating directly with the chamber.

Thus, it is not necessary to bring the introduction line directly into the chamber. This avoids the need to modify the chamber or give it a complicated configuration.

In an embodiment, the aircraft comprises a supply line extending in the tank and connecting a circuit supplying the aircraft with fuel from the outside of the aircraft to the chamber, the measurement line opening into the supply line and comprising a flow limiting device, such as a non-return valve or different cross-sections of fluid passage, capable of limiting or preventing passage of the fuel from the introduction line to the supply line via the measurement line.

Hence, this device avoids or limits a reflux of fuel into the supply circuit when the fuel coming from the injection system is returned into the chamber. It is not necessary to prevent this return entirely. For example, it could be accepted that 10% of the fuel coming from the injection system forms this reflux. A simple flow limiter, for example, may be suitable. For example, it is possible that the cross-section of the measurement line is narrower in a section leading from the introduction line to the supply line than in another section leading from the introduction line to the chamber.

The invention can be used for various applications.

In one of these, the aircraft comprises a control device configured to control the implementation of a method for determining the properties of the fuel supplying the engine, in which method the following steps are implemented in the following order:

a first density value, a first dielectric constant value and a first temperature value of the fuel are measured in the chamber at a first time;

a second density value, a second dielectric constant value and a second temperature value of the fuel are measured in the chamber at a second time, chosen so that the first and second temperature values are different;

on the basis of the first and second values, parameters are determined of at least one function for calculating a density from a temperature or from a dielectric constant;

a volume flow rate value and at least one from among a third temperature value and a third dielectric constant value of the fuel in a fuel injection line into the engine, are measured;

by taking account of the third value or at least one of the third values, and at least one of the functions, a density value of the fuel is determined, and on the basis of the values for volume flow rate and density, a mass flow rate of the fuel in the injection line is determined.

Hence, this chain of steps enables a better knowledge of the properties of the fuel during injection into the engine and, therefore, better control of the quantity of fuel to be injected.

Indeed, in a first stage, the two first measurement steps are performed at times when the temperatures of the fuel are different due to the temperature change enabled by the valve. They therefore make it possible, in the third step, to obtain the parameters of at least one of the three above-mentioned functions, in particular those making it possible to calculate a density on the basis of a temperature or a dielectric constant. This is, in particular, the case for the Clausius-Mossotti formula, making it possible to determine the parameters A and B. All or part of the general properties of the fuel are therefore known.

Then, in a second stage, the measurement of the volume flow rate, the dielectric constant and/or the temperature makes it possible to determine a value of its density in the injection line, before its injection into the engine. Since the mass flow rate is determined at this location, a determined quantity of fuel can be injected responding to the performance and safety requirements while limiting the quantity of over-consumed fuel, in other words without excessive margin.

Since this second stage is implemented on the injection line, in particular at the effective temperature at which the fuel is injected, the quantity of fuel injected is determined by closely taking into account the properties of the fuel at this point and therefore with a particularly good precision.

It is also possible, according to the invention, to provide a method for determining properties of a fuel supplying the engine of an aircraft according to the invention, in which method, on-board the aircraft, the following steps are implemented in the following order:

a first density value, a first dielectric constant value and a first temperature value of the fuel are measured in the chamber at a first time;

a second density value, a second dielectric constant value and a second temperature value of the fuel are measured in the chamber at a second time, chosen so that the first and second temperature values are different;

on the basis of the first and second values, parameters are determined of at least one function for calculating a density from a temperature or from a dielectric constant, a volume flow rate value and at least one from among a third temperature value and a third dielectric constant value of the fuel in a fuel injection line into the engine, are measured;

by taking account of the third value or at least one of the third values, and at least one of the functions, a density value of the fuel is determined, and on the basis of the values for volume flow rate and density, a mass flow rate of the fuel in the injection line is determined.

In an embodiment, after the first time and before the second time, the fuel is introduced into the chamber from the fuel injection system.

This represents a possibility for increasing the temperature of the fuel in the chamber.

It is possible that a fourth temperature value is measured during the measurement of the third temperature value.

The measurement of these two quantities provides a redundancy, so as to be able to detect an anomaly or a failure and to take this into account when determining the density of the fuel.

Advantageously, it is then determined whether a difference between the third and fourth temperature values exceeds a predetermined threshold.

This allows a test to be performed on the temperature values obtained. If the test reveals that the threshold is exceeded, this means that at least one of the temperature sensors is giving an unreliable value. The threshold is equal, for example, to twice the value of a tolerance interval of the temperature measurement chain. Hence if this interval is 0.1° C., then the threshold will be 0.2.

Advantageously, on the basis of the respective third values and by means of the functions, test values of the density are calculated, for the or each pair of test values considered, two-by-two, it is determined whether a difference between the test values exceeds a predetermined threshold, and as a function of the result of this determination, the value of the density of the fuel is determined.

Hence, here again, having several test values ensures a redundancy which enables an anomaly or a failure to be detected and taken into account. For example, in the presence of a sole pair of test values, the exceeding of the threshold is the sign of an anomaly. In the presence of two or more test values, it is possible to choose to keep only one or more of the test values and to no longer use one or more others which are identified as suspect. The result of this comparison of the test values can also be advantageously considered with that of the comparison of the third and fourth temperature values where appropriate, knowing that one or more of the test values results from a calculation performed on the basis of one of these temperature values.

In an embodiment, the density value is determined without taking into account one, two or three of the test values.

The density value can be determined by taking account of at least one other value measured during the implementation of the method of the invention for another engine of the aircraft, or by taking account of at least one other predetermined function, in particular without taking account of the test values.

In the first case, the values measured on the first engine are therefore completely discounted and the precise properties of the fuel obtained using the method continue to be used, but when it is implemented on the other engine.

In the other case, the function is for example a default function which therefore does not take strict account of the properties of the fuel as injected. This may involve one or more fuel characterisation laws such as mentioned above, but in their general version which is not precisely adapted to the fuel used in this case.

DESCRIPTION OF THE FIGURES

An embodiment of the invention will now be described by way of a non-limiting example with support of the drawings, in which:

FIG. 1 shows an aircraft according to an embodiment of the invention, such as an airplane 2. This airplane comprises a plurality of engines 4, for example turbojet engines. It is assumed, for example, that the airplane has at least one engine on each side of a fuselage of the airplane.

Figures 1, 2:
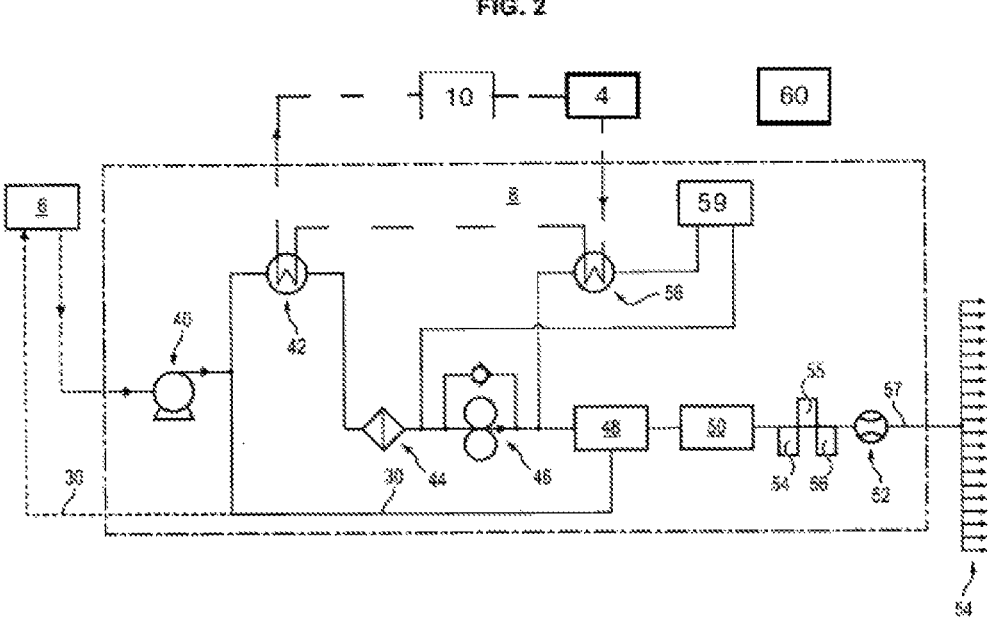
FIG. 1 is a diagram showing an injection circuit of an aircraft and one of its tanks, in an embodiment of the invention.
FIG. 2 is a more detailed view of the injection circuit of the aircraft of FIG. 1, FIGS. 3 to 5 show curves representing the density and the dielectric constant as a function of the temperature and the density.

The airplane also comprises fuel tanks, one of which 6 is illustrated in the figures. It is also equipped with a system 8 for injecting fuel into the engine, which also ensures a heat exchange with a cooling fluid formed by the oil circulating from an oil tank 10. Hence, as illustrated in FIG. 1 by the dashed-line arrows, the oil 12 passes from the oil tank 10 into the engine 4 in order to cool it, then into the injection system 8 to heat the fuel which passes through the latter in order to supply the engine 4. Finally the oil returns to its tank 10. This figure provides a summary illustration of the fuel circuit.

The airplane has a fuel filler port 14 for supplying the tank with fuel from outside the airplane. It communicates with a filling line 16 extending outside and inside the tank 6 to a terminal end 18 of the line opening into the tank. A measurement line 20 extends from a central portion of the filling line 16 and diverts part of the fuel flow from the latter to a measurement chamber 22 extending inside the tank 6 and communicating with the latter so that the fuel can pass freely from the chamber to the rest of the tank and vice versa. This chamber 22 is equipped with sensors for measuring the properties of the fuel in the tank. In the present example, this respectively involves a density sensor 24, a dielectric constant sensor 26 and a temperature sensor 28.

The fuel circuit is illustrated by the solid lines in FIG. 1. Hence the fuel passes from the tank 6 to the injection system 8, then is injected by the latter into the engine 4 via the injection line 57. Since excess fuel frequently arrives in the injection system 8, part of it is sent back to the tank 6 via a reintroduction line 30 which opens directly into the tank.

In the present example, this reintroduction line is equipped with a bypass line which forms an introduction line 32 which places it in direct communication with a central part of the measurement line 20. The introduction line is connected to the reintroduction line in a region located between the system 8 and the tank 6 in the present example. In this way, the fuel passing from the introduction line 32 into the measurement line 20 is directly introduced into the chamber 22 without passing via the general volume of the tank and without mixing with the rest of the fuel located there. The measurement line 20 is equipped with a non-return valve 34 in order to prevent the fuel rising in the filling line 16 on this occasion. The non-return valve 34 only opens during filling of the tank from outside the aircraft. Finally, the introduction line 32 is equipped with a valve 36 which can interrupt the passage of fuel therein when desired.

The chamber 22 is produced, for example, as described in document WO 2018/002682 in order that the modification of the fuel circuit in order to implement the invention can be mainly limited to the addition of the line 32 with its valve 36.

A more detailed version of the injection system 8 is illustrated in FIG. 2. The fuel coming from the tank 6 passes through a low-pressure centrifugal pump 40 then a heat exchanger 42 with the oil, a filter 44 and a high-pressure pump 46. In the remainder of the circuit, which is at high pressure, the fuel passes through a fuel meter 48 then a cut-off valve 50, a flow meter 52 and then arrives in the injectors 54. The oil passes from the tank 10 to exchanger 58 then to exchanger 42 in order then to be directed to the engine 4.

Downstream of the pump 46 and upstream of the metering device 48, a part of the fuel is diverted to a heat exchanger 58 with the oil, then to cylinder servo valves 59 in order to be finally reintroduced into the low-pressure circuit upstream of the pump 46. These cylinders are cylinders of the engine in which the fuel is used as hydraulic fluid (it involves for example air bleed control cylinders).

A part of the fuel located in the metering device 48 is sent via the reintroduction line 30 to the tank 6. The line 30 is at low pressure and is also referred to as a fuel recirculation line. It is used to return the excess pumped fuel to a point upstream of the high-pressure pump 46 since, according to the operating phases of the engine, a more or less significant part of the flow supplied by this pump is in excess compared to the flow rate which must be supplied from the metering device to the combustion chamber of the engine. The fuel returned upstream of this pump can be entirely reintroduced into the circuit downstream of the low-pressure pump 40, but it is also possible to reintroduce all or part of this fuel return into the fuel tank 6, as is the case here.

The injection line 57 bearing the flow meter 52 is also equipped with two temperature sensors 54, 55 and a dielectric constant sensor 56.

In this case the fuel is kerosene but it could also be a mixture of kerosene with biofuel, or even 100% biofuel.

Finally the airplane comprises computer control means 60 comprising processing means and one or more memories, connected to the various elements of the airplane. These means are configured so as to implement, on-board the airplane, the method comprising the steps which are now described.

In a first step, at a first time, measurement is made of:
a first density value $D_1$,
a first dielectric constant value $K_1$ and
a first temperature value $T_1$.

These measurements are performed by means of the sensors 24, 26 and 28 of the chamber 22 and concern the fuel located in the chamber, inside the tank 6. They are performed when the fuel return valve 36 is closed.

Then, the fuel coming from the injection system 8 is introduced into the chamber 22. For this purpose, valve 36 is opened, which causes a flow of fuel into the introduction line 32 then directly into the measurement line 20 and to the chamber 22.

Since this fuel comes from the injection system 8, it is at a temperature higher than that of the fuel initially found in the chamber 22. This therefore causes a temperature change of the fuel in the chamber 22. The above-mentioned replacement mode is implemented here with, in addition, a small amount of mixing and heat exchange.

It is also observed that, then, when the entry of the fuel via the line stops, i.e. with the valve 36 closed, the fuel from the tank pushes on that in the chamber in order to take its place. This enables a cyclic operation for the alternating measurement of the properties of the fuel in the tank and of that returning from the injection system.

Then, at a second time, the same sensors are used to measure, in the chamber:
a second density value $D_2$,
a second dielectric constant value $K_2$ and
a second temperature value $T_2$ of the fuel.

This second time follows the arrival of the heated fuel so that the first and second temperature values $T_1$, $T_2$ are different. The same applies for the other first and second values.

As can be seen, in this example, the first and second density values $D_1$, $D_2$ are therefore measured by means of the same density sensor 24, the first and second dielectric constant $K_1$, $K_2$ by means of the same dielectric constant sensor 26, and the first and second temperature $T_1$, $T_2$ by means of the same temperature sensor 28.

In a following step, the parameters of the functions $f_1$, $f_2$ and $f_3$ are determined on the basis of the first and second values, as:

$$D=f_1(T), D=f_2(K) \text{ and } K=f_3(T)$$

making it possible to calculate, respectively:
a density D from a temperature T,
a density D from a dielectric constant K, and
a dielectric constant (K) as a function of a temperature T.

Figure 3:
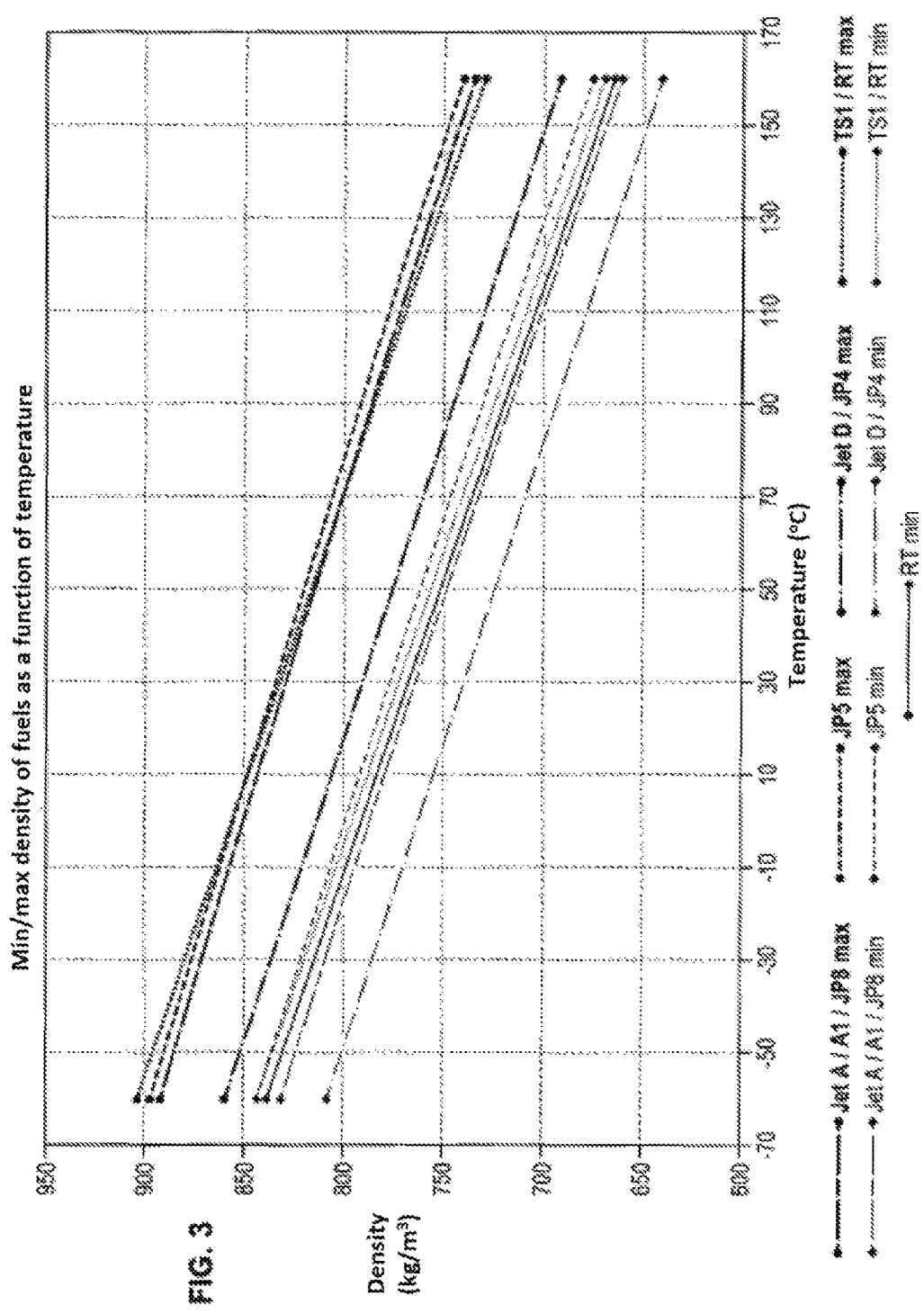
Figure 4:
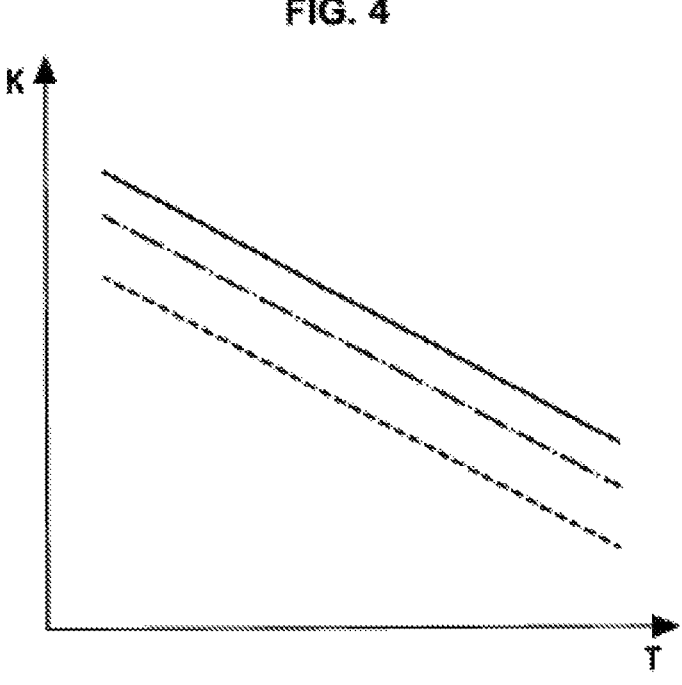

These three functions are those which have been described above. $f_1$ and $f_3$ have a classical affine linear equation of type y=cx+e. Their graphs are illustrated in FIGS. 3 and 4 respectively for different types of fuel used in airplane engines. The second function $f_2$ is that of the above-mentioned formula derived from the so-called generic "Clausius-Mossotti" formula and has an equation of type:

$$D=(K-1)/[A+B(K-1)]$$

Figure 5:
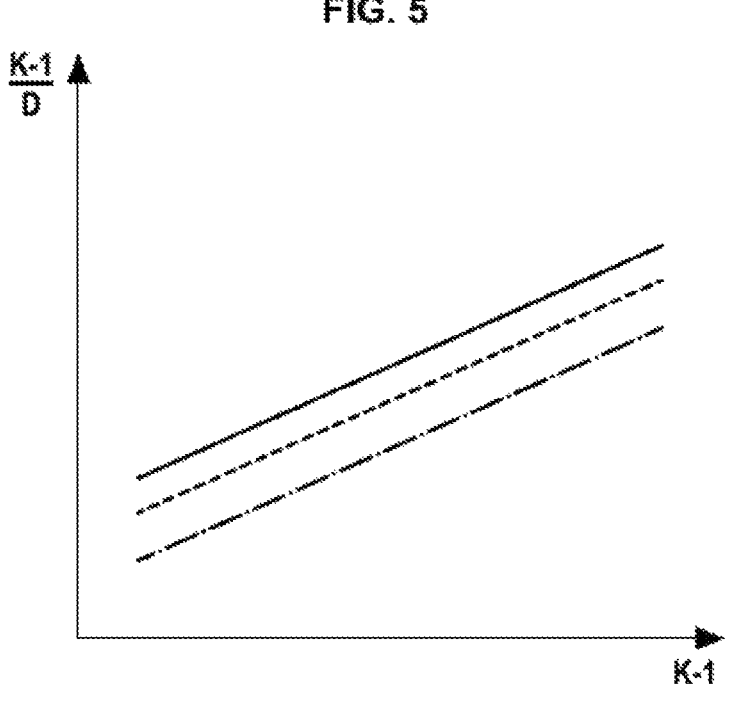

If it is assumed that x=K−1 and that y=(K−1)/D as is the case in document US2016/0123860, an affine linear formula is obtained of type y=cx+e, the graph of which is illustrated in FIG. 5.

It is important to note that the use of affine equations in the present case for the three formulas is a choice, and that other types of formulas are possible.

Under these conditions, knowing the first and second measured values, the computer is able to determine the parameters c and e for each of the two functions $f_1$, $f_3$ and the parameters A and B for function $f_2$. In this way, the three functions or laws governing the relations between the properties of the fuel are determined. Hence the three quantities measured at two different temperatures enable the fuel to be precisely characterised and to predict the change in one of the quantities over time on the basis of one of the others, using the three functions.

In a following step, in the line 57 for injecting fuel into the engine, a measurement is made by means of the flow meter 52 and sensors 54, 55 and 56, with regard to the fuel in the line, of:

a value of volume flow rate DV, third and fourth temperature values $T_3$, $T_4$, and a third dielectric constant value $K_3$.

It is then determined whether the absolute value of a difference $T_3-T_4$ between the third and fourth temperature values exceeds a predetermined threshold. This threshold is chosen, in this case, as being equal to twice the tolerance interval associated with each temperature sensor 54, 55. However, it is possible to take into account another threshold value.

Furthermore, on the basis of the respective values $T_3$, $T_4$ and $K_3$ and by means of functions $f_1$, $f_2$ and $f_3$, test values $D_a$, $D_b$, $D_c$ of the density are calculated as follows:

$$D_a = f_1(T_3) \quad D_b = f_2(T_4) \quad D_c = f_3(K)$$

Then, for each pair of test values considered, two-by-two, it is determined whether a difference in absolute value between the test values exceeds a predetermined threshold. Then $|D_a-D_b|$, $|D_a-D_c|$ and $|D_b-D_c|$ are successively compared to this threshold.

The result of these four tests is then taken into account in order to determine the density value $D_3$ to be considered in the rest of the method.

In the present example, a truth table is predetermined in order to respond to all the cases encountered. The names given to these tests and the table are presented below:

T_valid=If (|T−T'|<=authorised deviation) then OK (1/true) else NOK (0/false)

Dab_valid=If (|$D_a-D_b$|<=authorised deviation) then OK (1/true) else NOK(0/false)

Dac_valid=If (|$D_a-D_c$|<=authorised deviation) then OK (1/true) else NOK(0/false)

Dbc_valid=If (|$D_b-D_c$|<=authorised deviation) then OK (1/true) else NOK(0/false)

row "10" and column "01", the density value used for $D_3$ is $D_b$. This is a situation in which the following results are cumulated:

the test on the temperatures gives the value "true",

|$D_a-D_b$| exceeds the threshold,

|$D_a-D_c$| exceeds the threshold, and

|$D_b-D_c$| does not exceed the threshold.

As can be seen, in certain cases, it is one of the following values which is used for $D_3$: $D_a$, $D_b$, $D_c$, $(D_a+D_b)/2$, $(D_a+D_c)/2$, $(D_b+D_c)/2$, or $(D_a+D_b+D_c)/3$.

In the other cases, which correspond to the degraded mode in the presence of at least two failures, it is the default value which is used. This is primarily another value obtained during the implementation of the method of the invention on the other engine of the aircraft located on the other side of the fuselage. If this is no longer available, it is a value calculated on the basis of a default function giving the properties of a standard fuel and stored in the memory of the computer without taking account of the results of the sensor measurements in the chamber 22. Alternatively, this latter value can be used directly by default, without using the value given for the other engine. The default value takes into account the margins necessary to guarantee reliability and safety.

As can be seen in this table, in certain cases, the density value $D_3$ is determined without taking into account one, two or three of the test values $D_a$, $D_b$ and $D_c$.

In the present embodiment, the measurement of two temperature values $T_3$ and $T_4$ and of a dielectric constant value $K_3$ in the injection line 57 enables a redundancy which makes it possible, in return, to detect the occurrence of an anomaly or a failure, or even a complete failure corresponding to the delivery of an erroneous measurement by a sensor. The complete failure case is that illustrated in the three underlined boxes which are cases (00, 10), (00, 01) and (11, 00). It can also be seen that only the last box at the bottom right of the table is associated with the absence of any anomaly and takes into account the three values $D_a$, $D_b$ and $D_c$ for the calculation of the density. The detection of an anomaly or a failure makes it possible to dismiss the suspect value or values for the remainder of the method as originating from an erroneous measurement.

In a last step, a mass flow rate DM of the fuel in the injection line 57 is determined on the basis of the thus determined values of volume flow rate DV and density $D_3$.

This knowledge of the mass flow rate of the fuel under the conditions of injection into the engine 4 enables a more

| Truth table | | | | | |
|---|---|---|---|---|---|
| | D | | Dac_Valid | Dbc_Valid | |
| | used | 00 | 10 | 01 | 11 |
| T_Valid | 00 | Dc | $(D_a + D_c)/2$ | $(D_b + D_c)/2$ | $D_c$ |
| Dab_Valid | 10 | D default | $\overline{D_a}$ | $\overline{D_b}$ | $D_c$ |
| | 01 | D default | $D_a$ | $D_b$ | $D_c$ |
| | 11 | $\underline{(D_a+ D_b)/2}$ | $(D_a + D_b)/2$ | $(D_a + D_b)/2$ | $(D_a + D_b + D_c)/3$ |

Each box of the table contains the density value D which will be taken into account for the rest of the method as a function of the test results. (Some values are underlined for reasons explained below). For example, at the intersection of precise metering without compromising the performance, reliability and safety, and while reducing the margin of overconsumption.

The arrangement illustrated in FIG. 1 is particularly well suited to the determination of the properties of the fuel on the basis of the measurements performed in the tank 6 in order to take them into account for the determination of its properties in the injection line 57, which is advantageous for a precise metering of the injected fuel.

Figure 6:
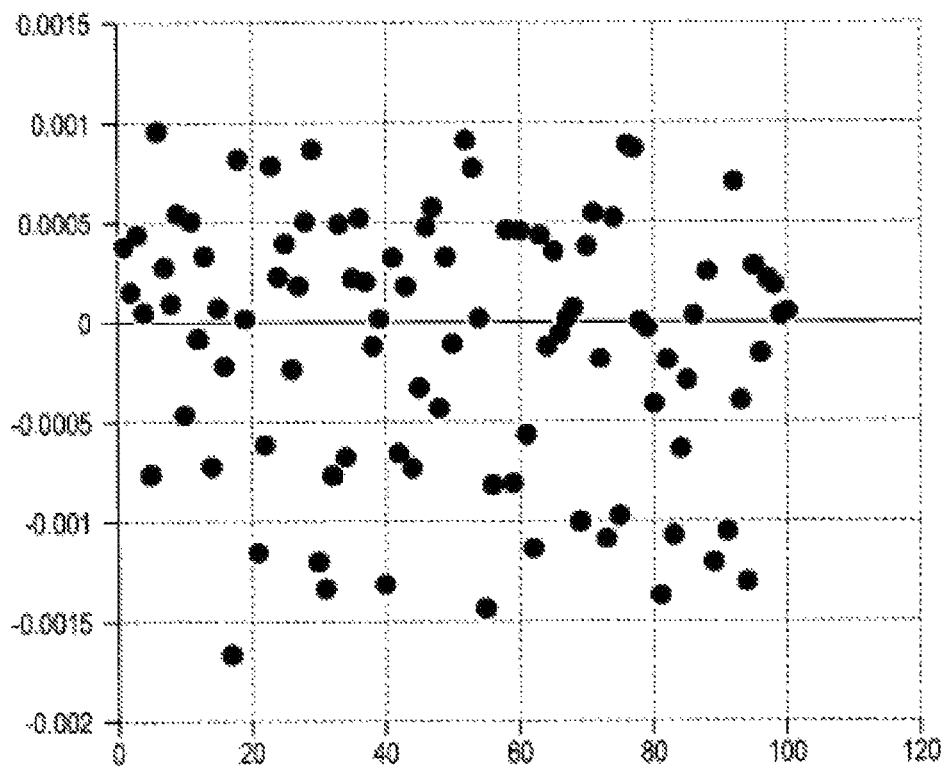
FIG. 6 is a point cloud showing a test result of the method of the invention.

FIG. 6 illustrates the result of a simulation of the method of the invention implementing 100 random selections of the values $T_3$, $T_4$ and K generating errors on the latter with respect to the values expected for a fuel of predetermined density $D_p$. A density value $D_d$ was obtained by implementing the above method, and was compared with this predetermined value $D_p$. It is the difference between these two values which is illustrated on the ordinate in the figure, with the random number appearing on the abscissa. It is seen that the difference in absolute value never exceeds 2/1000, which demonstrates the reliability of the method of the invention.

Of course, numerous modifications could be made to the invention without going beyond its scope.

Many different strategies are possible for determining the density of the fuel on the basis of the quantities measured in the injection line 57. If a table is used, this could be different from the table presented above. For example, in certain cases, it could be possible to use the default value in a place where it is not currently used, or other values than those which appear there. It is also possible to dispense with calculating an average of certain values or all the values as is the case in some boxes and simply substitute one of the values there.

Some redundancies could be dispensed with.

By way of example also, the value of the dielectric constant obtained by calculation on the basis of the measured temperature is not used in the strategy presented above for determining the density to be taken into account. However, it could be used in another strategy, for example by comparing this calculated value with the measured value of the constant.

The invention claimed is:

1. An aircraft comprising:

at least one engine, at least one fuel tank, a chamber which is located in the fuel tank, occupying only a part of the fuel tank and comprising at least one sensor for measuring a property of fuel in the fuel tank, an injection system configured to inject fuel into the engine, and an introduction line for introducing fuel from the injection system into the chamber, the introduction line comprising a valve capable of preventing an introduction of fuel from the injection system into the chamber via the introduction line, wherein the aircraft further comprises a memory, and at least one processor connected to the at least one sensor, the at least one processor being configured to determine density and mass flow rate of the fuel supplying the engine, by performing the following steps in order:

measure a first density value, a first dielectric constant value and a first temperature value of the fuel in the chamber at a first time, measure a second density value, a second dielectric constant value and a second temperature value of the fuel in the chamber at a second time chosen so that the first temperature value and the second temperature value are different;

based on the first density value, the first dielectric constant value, the first temperature value, the second density value, the second dielectric constant value and the second temperature value, determine parameters of at least one function for calculating a density from a temperature or from a dielectric constant;

measure a volume flow rate value and at least one from among a third temperature value and a third dielectric constant value of the fuel in a fuel injection line into the engine;

based on the at least one from among the third temperature value and the third dielectric constant value, and the at least one function, determine a density value of the fuel in the fuel injection line, and based on the volume flow rate value and the determined density value, determine a mass flow rate of the fuel in the fuel injection line.

2. The aircraft according to claim 1, wherein the sensor or one of the sensors is a density sensor.

3. The aircraft according claim 1, wherein the sensor or one of the sensors is a dielectric constant sensor.

4. The aircraft according to claim 1, wherein the sensor or one of the sensors is a temperature sensor.

5. The aircraft according to claim 1, wherein the introduction line opens into a measurement line communicating directly with the chamber.

* * * * *